United States Patent
Itoh (10) Patent No.: US 9,558,580 B2
(45) Date of Patent: Jan. 31, 2017

(54) IMAGE PROCESSING APPARATUS AND METHOD THEREFOR

(71) Applicant: CANON KABUSHIKI KAISHA, Tokyo (JP)

(72) Inventor: Yasuhiro Itoh, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/593,376

(22) Filed: Jan. 9, 2015

(65) Prior Publication Data
US 2015/0199838 A1 Jul. 16, 2015

(30) Foreign Application Priority Data
Jan. 10, 2014 (JP) .................................. 2014-003697

(51) Int. Cl.
*G06T 15/06* (2011.01)
*G06T 7/00* (2006.01)
*G06T 15/50* (2011.01)

(52) U.S. Cl.
CPC ..................................... *G06T 15/06* (2013.01)

(58) Field of Classification Search
None
See application file for complete search history.

(56) References Cited

U.S. PATENT DOCUMENTS

| | | | | | |
|---|---|---|---|---|---|
| 6,476,805 B1* | 11/2002 | Shum | .................... | G06T 7/0022 345/420 |
| 2008/0297593 A1* | 12/2008 | Debevec | .............. | G02B 27/225 348/51 |
| 2010/0271467 A1* | 10/2010 | Akeley | .............. | H04N 13/0406 348/59 |
| 2013/0082905 A1* | 4/2013 | Ranieri | .............. | H04N 13/0409 345/32 |
| 2013/0113981 A1* | 5/2013 | Knight | ............... | H04N 5/23212 348/345 |
| 2014/0176540 A1* | 6/2014 | Tosic | ..................... | G06T 17/00 345/420 |
| 2014/0204111 A1* | 7/2014 | Vaidyanathan | .... | G02B 27/0075 345/592 |
| 2016/0139402 A1* | 5/2016 | Lapstun | .................. | G02B 6/34 349/193 |

OTHER PUBLICATIONS

Ng et al., "Light Field Photography with a Hand-held Plenoptic Camera", Stanford Tech Report CTSR Feb. 2005, 2005, pp. 1-11.
Parker et al., "OptiX: A General Purpose Ray Tracing Engine", ACM Transactions on Graphics, Aug. 2010, pp. 1-13.

* cited by examiner

*Primary Examiner* — Kimberly A Williams
(74) *Attorney, Agent, or Firm* — Carter, DeLuca, Farrell & Schmidt, LLP (57) ABSTRACT

A first surface, a second surface, and a third surface are set in order in a direction of a scene, and the first surface has a plurality of cells and a plurality of sub-cells divided from each of the plurality of cells, the second surface has a plurality of segments, and the plurality of cells and the plurality of segments are associated respectively. A trace direction of a ray passing through each sub-cell is determined based on a segment associated with a cell including the sub-cell. Ray tracing on the determined trace direction is performed for each sub-cell so as to generate light-field data of the scene between the second and third surfaces.

14 Claims, 9 Drawing Sheets

IMAGE PROCESSING APPARATUS AND METHOD THEREFOR

BACKGROUND OF THE INVENTION

Field of the Invention

The present invention relates to image processing of rendering a scene by tracing rays.

Description of the Related Art

In recent years, there is proposed a technique, called computational photography, of generating image data based on information (to be referred to as "light-field data" hereinafter) about the directions and intensities of rays in a space (see, for example, literature 1). Since image data for which the focus is adjusted after image capturing can be generated using this technique, it is possible to advantageously compensate for a failure in focus adjustment at the time of image capturing with image processing.

In computational photography, image data (light-field data) for which focus adjustment is possible after shooting is obtained using a light field camera. Examples of the light field camera are a Plenoptic camera in which a microlens array is arranged in front of an image sensor and a multiple-lens camera in which a number of sets of image sensors and lenses are incorporated.

The user may want to synthesize an image (to be referred to as a "CG image" hereinafter) created using a computer graphic rendering method (to be referred to as a "CG rendering method" hereinafter) on the image for which focus adjustment is possible. To do this, if CG rendering is performed without using light-field data, it is necessary to prepare CG images which are focused on all distances. In this case, however, since it takes long time to create such CG images, it is not preferable to prepare the CG images which are focused on all distances.

Therefore, it is desirable to create a CG image by computational photography by generating light-field data similar to that captured by the light field camera using the CG rendering method, and using the generated light-field data. As a method of creating light-field data by the CG rendering method, there is provided a method described in literature 2. Since, however, this method generates light-field data based on one ray for each pixel of an image, the quality of the generated light-field data is insufficient to be synthesized with captured light-field data.

Literature 1: R. Ng, M. Levoy, M. Bredif, G. Duval, M. Horowitz, P. Hanrahan "Light Field Photography with a Hand-held Plenoptic Camera" Stanford Tech Report CTSR 2005-02, 2005

Literature 2: Steven G. Parker et al. "OptiX™: A General Purpose Ray Tracing Engine" ACM Transactions on Graphics, August 2010

SUMMARY OF THE INVENTION

In one aspect, an image processing apparatus for generating light-field data of a scene using a ray tracing method, comprising: a setting unit configured to set a first surface, a second surface, and a third surface in order in a direction of a scene, wherein the first surface has a plurality of cells and a plurality of sub-cells divided from each of the plurality of cells, the second surface has a plurality of segments, and the plurality of cells and the plurality of segments are associated respectively; a determination unit configured to determine a trace direction of a ray passing through each sub-cell based on a segment associated with a cell including the sub-cell; and a generation unit configured to perform ray tracing on the determined trace direction for each sub-cell so as to generate light-field data of the scene between the second and third surfaces.

According to the aspect, it is possible to generate, by computer graphics, image data equivalent to light-field data captured by the light field camera.

Further features of the present invention will become apparent from the following description of exemplary embodiments with reference to the attached drawings.

DESCRIPTION OF THE EMBODIMENTS

The present invention will be described in detail below based on preferred embodiments of the present invention with reference to the accompanying drawings. Note that arrangements shown in the following embodiments are merely examples, and the present invention is not limited to the illustrated arrangements.

First Embodiment

Image processing of generating light-field data using a ray tracing method will be explained below.

[Ray Tracing]

Figure 1:
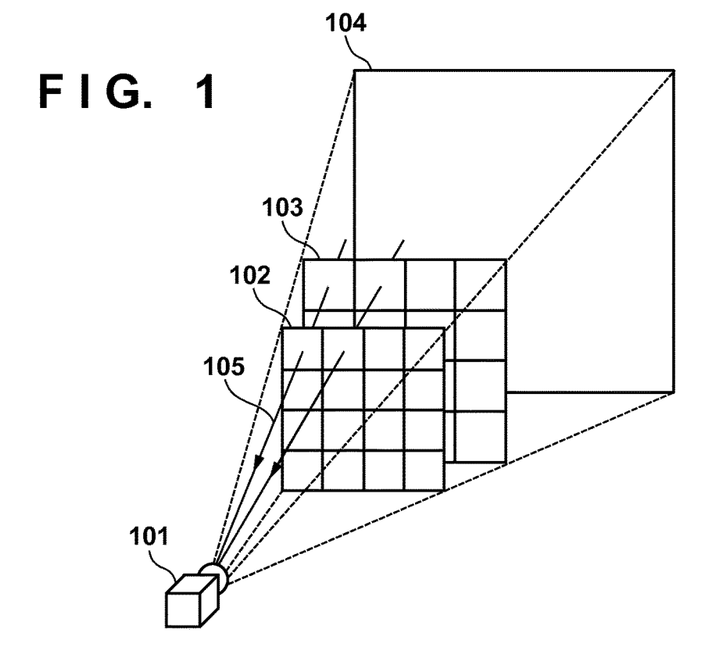
FIG. 1 is a view for explaining a ray tracing method.

The difference between a general ray tracing method and a ray tracing method according to this embodiment will first be described with reference to FIG. 1.

In the ray tracing method, a ray 105 that enters a camera 101 as a view point at which a scene is observed is traced backward. Between a front clipping plane 102 and a back clipping plane 104, the intensity of the ray 105 at a given point on the front clipping plane 102 is determined based on an object which the ray strikes, and the color of an illuminant. If a rendering result is displayed by, for example, 800×600 pixels, the front clipping plane 102 is divided into 800×600 cells, and a line connecting the camera 101 and the center of each cell is set as a ray. That is, the cells of the front clipping plane 102 correspond to the pixels of an image to be rendered. It is possible to render a CG image expressing the light intensity on the front clipping plane 102 by calculating the intensity of the ray 105 for each cell.

In the ray tracing method of this embodiment, a lens array surface 103 is provided between the front clipping plane 102 and the back clipping plane 104. The lens array surface 103 corresponds to a microlens array in the light field camera. A specific cell of the lens array surface 103, through which the ray 105 passes, is defined according to a position at which the ray 105 intersects the front clipping plane 102. It is, therefore, necessary to arrange the lens array surface 103 between the front clipping plane 102 and the back clipping plane 104. To allow rendering as light-field data, it is necessary to arrange scene data such as an object within the range from the lens array surface 103 to the back clipping plane 104.

As described above, since a substantial rendering range is set between the lens array surface 103 and the back clipping plane 104, the lens array surface 103 corresponds to the front clipping plane in the general ray tracing method, and corresponds to an imaging surface in the light field camera. The front clipping plane 102 corresponds to a light-receiving surface (sensor surface) in the light field camera. In other words, the first, second, and third surfaces are sequentially set from the view point 101 in the direction of a scene to be rendered, and the trace direction of a ray is defined according to the intersection of the ray on the first surface, thereby recording, on the first surface, the light field of the scene between the second and third surfaces. That is, in FIG. 1, the front clipping plane 102, the lens array surface 103, and the back clipping plane 104 correspond to the first, second, and third surfaces, respectively.

Note that the ray tracing method is a method of tracing backward a ray entering the view point up to the illuminant or background. However, for the sake of simplicity, the ray tracing method may be described as a method of tracing a ray emitted from the view point.

Figure 2:
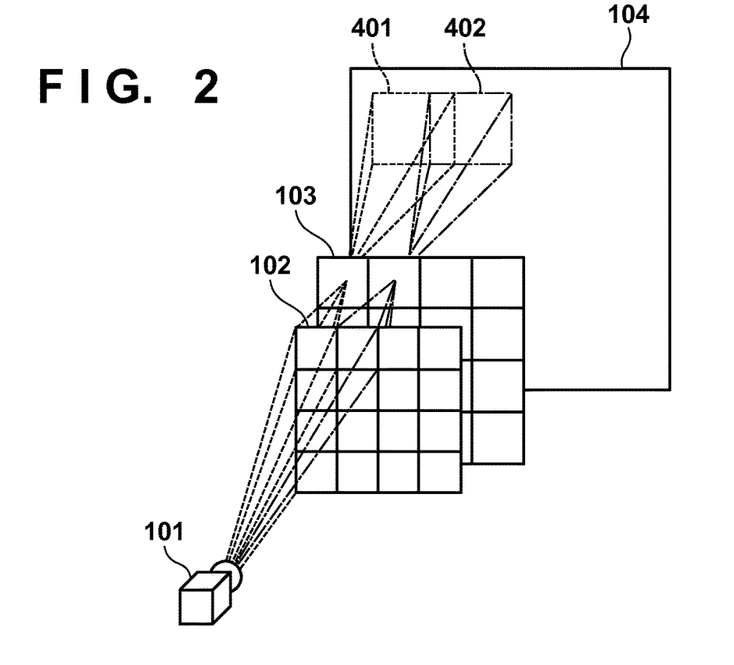
FIG. 2 is a view for explaining a ray tracing method according to an embodiment.

FIG. 2 is a view showing the relationship between the intersections of rays on the front clipping plane 102 and the cells of the lens array surface 103, through which the rays pass, in the ray tracing method according to the embodiment.

As indicated by broken lines or one-dot dashed lines for each cell in FIG. 2, after the ray intersects the front clipping plane 102, the traveling direction of the ray is defined as a direction toward a cell (to be referred to as a "lens" hereinafter) of the lens array surface 103, which is associated with the intersecting cell of the front clipping plane 102, and the ray reaches a given range (for example, a region 401) of the back clipping plane 104. The size of the region of the back clipping plane 104 which the ray having passed through a given cell of the front clipping plane 102 reaches, that is, the size of a range (to be referred to as a "ray traveling range" hereinafter) within which the traveling direction of the ray having passed through the given cell of the front clipping plane 102 changes is determined according to the size of the cell of the front clipping plane 102.

In CG rendering, for each cell of the front clipping plane 102, light energy may be determined using a plurality of rays rather than one ray. This is done to obtain a high-resolution rendering result by gradually changing the passage position of the ray within the cell of the front clipping plane 102. In this embodiment, by gradually changing the intersection of the ray passing through the cell of the front clipping plane 102 with the cell, a position on the back clipping plane 104, at which the ray having passed through the lens array surface 103 reaches, is changed within a predetermined ray traveling range. This will be described in detail later.

As exemplified by the region 401 and a region 402 of the back clipping plane 104 in FIG. 2, the light traveling range overlaps another light traveling range. Although FIG. 2 shows the overlap of the neighboring ray traveling ranges in a lateral direction, neighboring ray traveling ranges in a longitudinal direction also overlap each other. Since the ray traveling ranges overlap each other, it is possible to generate light-field data similar to that captured by the light field camera.

[Generation of Light-Field Data]

Figure 3A:
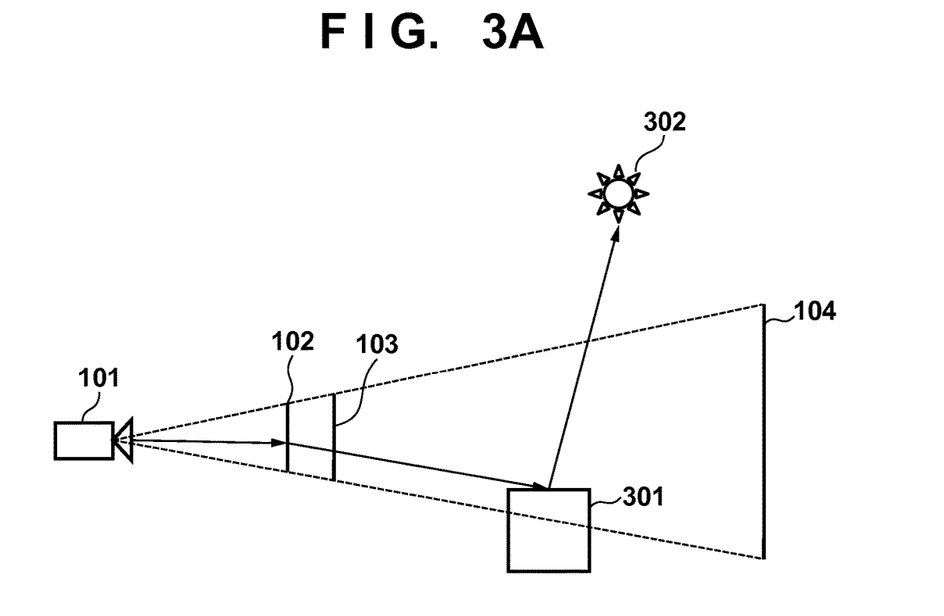
FIGS. 3A and 3B are views for explaining a light-field data generation method.
Figure 3B:
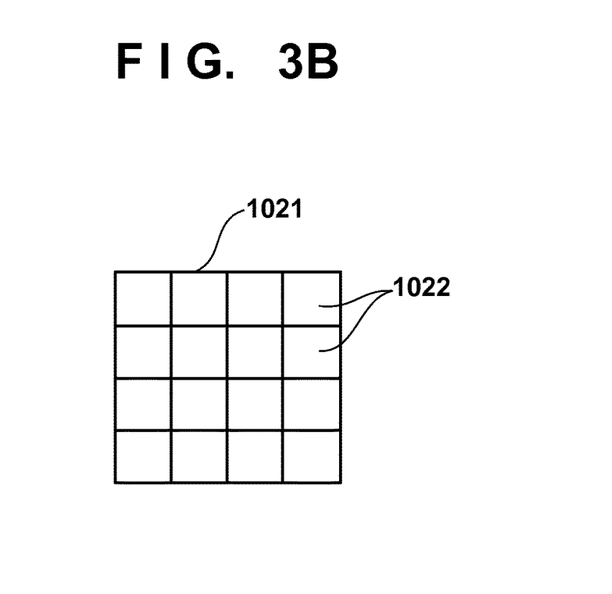

An overview of a light-field data generation method in image processing according to this embodiment will be described with reference to FIGS. 3A and 3B.

In ray tracing in the ray tracing method, a ray is traced backward from the view point to the illuminant to calculate the color of an object. Referring to FIG. 3A, the camera 101 serves as a view point in ray tracing, and a line connecting the camera 101 and the front clipping plane 102 indicates a ray to be traced. A lens of the lens array surface 103, through which the ray passes, is defined according to the intersection of the ray with the front clipping plane 102, thereby determining the trace direction of the ray.

When the ray reaches the back clipping plane 104, tracing of the ray ends to refer to a background color. On the other hand, Some rays strike an object 301, and are reflected by the object 301 to reach an illuminant 302, thereby calculating the light intensity.

Since the trace direction of a ray is defined according to the intersection with the front clipping plane 102, a ray from a limited range (corresponding lens) enters each cell forming the front clipping plane 102. To generate light-field data recording not only the light intensity but also a light incident direction, sub-cells 1022 are formed by subdividing each cell 1021 of the front clipping plane 102, as shown in FIG. 3B. A direction connecting a lens corresponding to each cell 1021 and each sub-cell 1022 included in the cell 1021 indicates the light incident direction. In other words, each cell 1021 corresponds to one pixel of the light field camera, and each sub-cell 1022 corresponds to one light-receiving element of the light field camera. Note that FIG. 3B exemplifies 4×4 sub-cells 1022. The resolution in the light incident direction of the light-field data depends on the number of sub-cells. Therefore, the division number of the sub-cells is determined according to the accuracy of the generated light-field data.

As described above, as a result of the tracing of the ray whose trace direction is defined according to the intersection with the front clipping plane 102, information recorded in the front clipping plane 102 with the plurality of cells each including the plurality of sub-cells is information (light-field data) recording the light intensity and the light incident direction, like the information captured by the light field camera.

To correctly reproduce a color, spectral ray tracing for performing ray tracing for at least all wavelengths of the ray emitted by the illuminant 302 within the visible range is required. However, such spectral ray tracing increases a calculation amount. To solve this problem, in this embodiment, light-field data is generated based on the result of performing spectral ray tracing for a segmented wavelength of the ray or the result of performing ray tracing for a plurality of channels (for example, RGB channels or RGB-CMY channels).

[Apparatus Arrangement]

Figure 4:
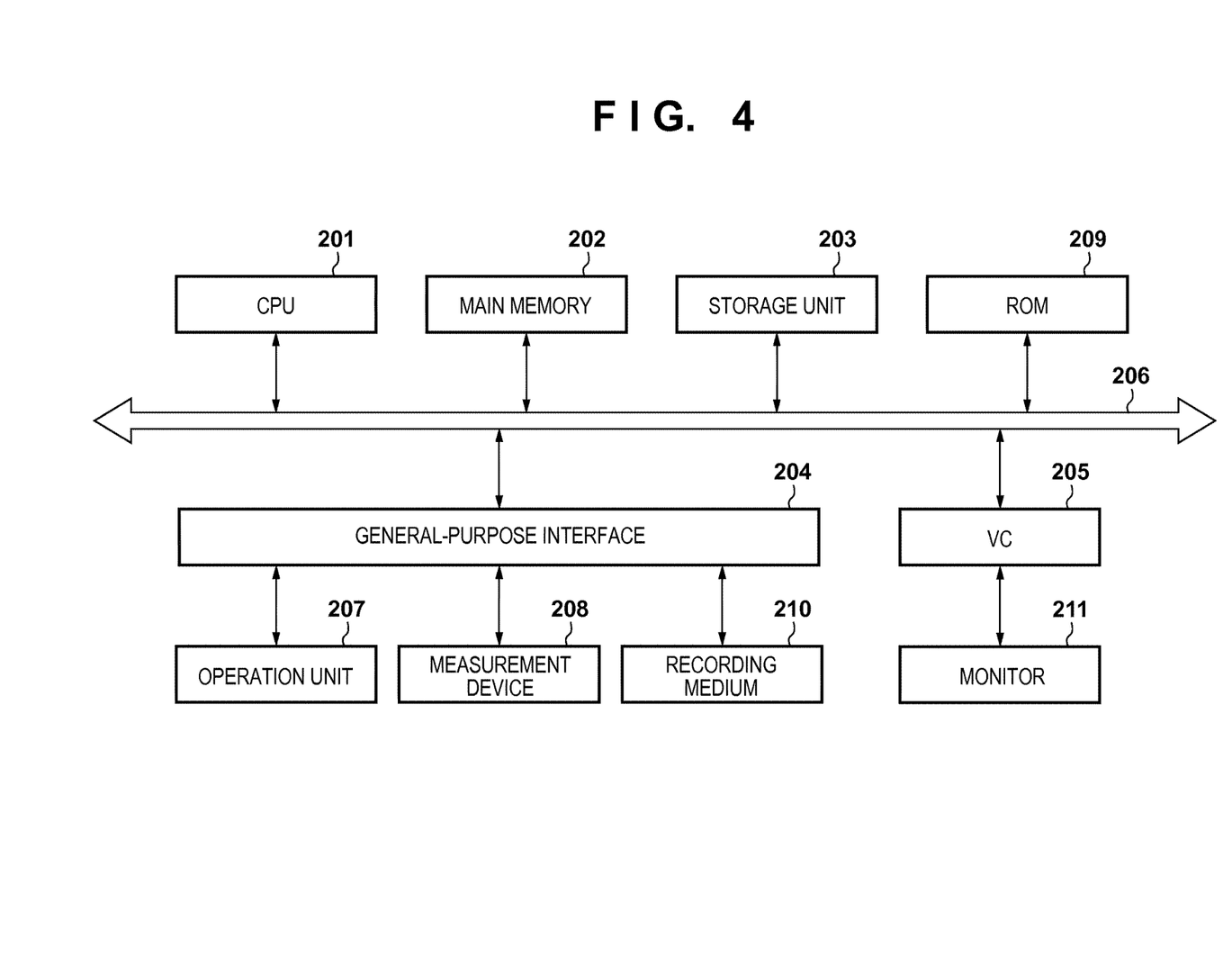
FIG. 4 is a block diagram showing the arrangement of an information processing apparatus.

FIG. 4 is a block diagram showing the arrangement of an information processing apparatus for executing image processing according to this embodiment.

A microprocessor (CPU) 201 executes an operating system (OS) and programs stored in a read only memory (ROM) 209 and a storage unit 203 using a main memory 202 such as a random access memory (RAM) as a work memory, thereby controlling components (to be described later)

through a system bus 206. Note that the storage unit 203 is a hard disk drive (HDD), a solid-state drive (SSD), or the like, and stores programs for implementing image processing (to be described later) and various data.

An operation unit 207 such as a keyboard and a mouse, a measurement device 208 such as a spectral measurement device, a recording medium 210 such as a memory card or USB memory, and the like are connected to a general-purpose interface (I/F) 204 such as USB (Universal Serial Bus) or IEEE1394. A monitor 211 is connected to a video card (VC) 205. The CPU 201 displays, on the monitor 211, a user interface (UI) and information indicating the progression of processing and the result of processing.

For example, in accordance with a user instruction input through the operation unit 207, the CPU 201 loads, into a predetermined area of the main memory 202, an application program (AP) stored in the storage unit 203 or the recording medium 210. The CPU 201 executes the AP to display a UI on the monitor 211 in accordance with the AP.

Then, in accordance with a user operation of the UI, the CPU 201 inputs various data stored in the storage unit 203 or the recording medium 210 and measurement data from the measurement device 208, and loads them into a predetermined area of the main memory 202. In accordance with the AP, the CPU 201 performs predetermined arithmetic processing for these various data loaded in the main memory 202. In accordance with a user operation of the UI, the CPU 201 displays the arithmetic processing result on the monitor 211, or stores it in the storage unit 203 or the recording medium 210.

Note that the CPU 201 can transmit/receive programs, data, and arithmetic processing results to/from a server apparatus on a wired or wireless network through a network I/F (not shown) connected to the system bus 206. A tablet computer can also be used as an information processing apparatus. In this case, a touch panel overlaid on the screen of the monitor 211 serves as the operation unit 207.

[Image Processing]

Figure 5:
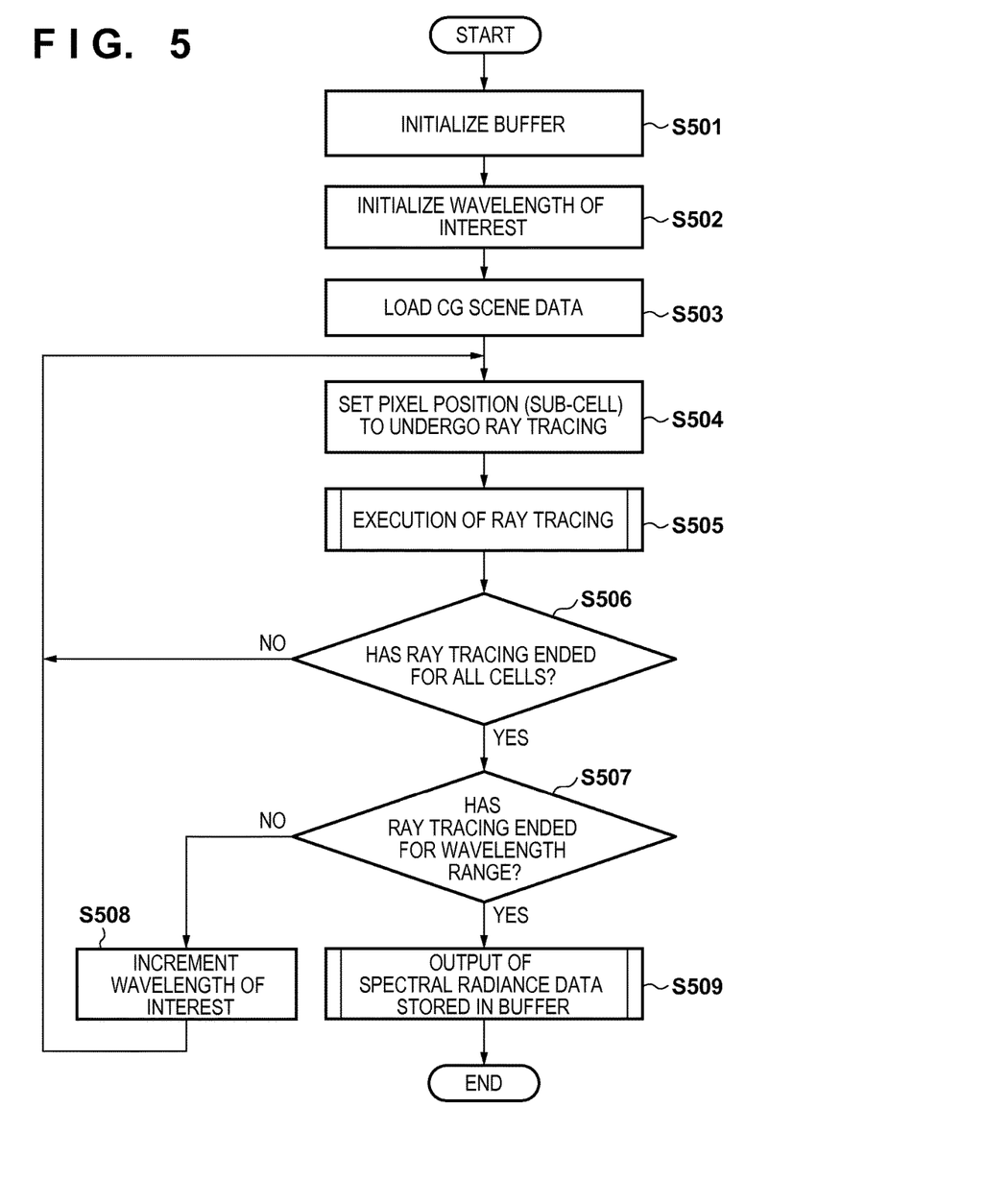
FIG. 5 is a flowchart illustrating image processing according the embodiment.

The image processing of this embodiment, which has been explained with reference to FIGS. 1 and 2, will be described with reference to a flowchart shown in FIG. 5. Note that processing shown in FIG. 5 is executed by the CPU 201 in accordance with an AP for image generation processing.

The CPU 201 allocates a buffer for holding light-field data obtained by ray tracing to a predetermined area of the main memory 202, and initializes the buffer (for example, clears the buffer to zero) (S501). The buffer holds light-field data obtained by ray tracing at discrete wavelengths within the visible light range (380 nm to 780 nm).

The CPU 201 initializes the wavelength (to be referred to as the "wavelength of interest" hereinafter) of a ray to be processed (S502). For example, the wavelength of interest is initialized by 380 nm, and then incremented by a pitch of 10 nm, that is, incremented to 390 nm, 400 nm, ..., 780 nm along with the progress of ray tracing (S508).

The CPU 201 loads CG scene data from the recording medium 210 (S503). Then, the CPU 201 sets a pixel position to undergo ray tracing, that is, a sub-cell of the front clipping plane 102 (S504). The pixel position is scanned in the raster order from the upper left cell of the front clipping plane 102 and in the raster order from the upper left sub-cell of the corresponding cell. However, the pixel position setting order is not limited to this.

The CPU 201 performs ray tracing for the ray of the wavelength of interest, and records the intensity (spectral radiance) of the light of the wavelength of interest in the sub-cell as a tracing result at an address corresponding to the sub-cell and the wavelength of interest in the buffer (S505). This will be described in detail later.

Subsequently, it is determined whether ray tracing of the wavelength of interest has ended for all the cells of the front clipping plane 102 (S506). If ray tracing has not ended, the process returns to step S504 to repeat steps S504 and S505 until ray tracing of the wavelength of interest ends for all the cells of the front clipping plane 102.

If ray tracing of the wavelength of interest has ended, the CPU 201 determines whether ray tracing has ended for the wavelength range (for example, 380 to 780 nm) within which ray tracing is performed (S507). If ray tracing has not ended, the wavelength of interest is incremented (S508), and the process returns to step S504 to repeat the processes in steps S504 to S506. Note that the increment pitch of the wavelength is not limited to 10 nm, and a larger pitch such as 20 nm or 50 nm or a smaller pitch such as 5 nm may be set according to the processing speed, processing time, processing accuracy, and the like of the apparatus.

If ray tracing has ended, the CPU 201 outputs spectral radiance data stored in the buffer (S509). For example, the CPU 201 stores the spectral radiance data in the recording medium 210 via the general-purpose I/F 204. The spectral radiance data stored in the buffer may be output to another apparatus intact as an image processing result, as a matter of course. By using computational photography, the CPU 201 can generate, based on the spectral radiance data, CG data which is focused on a shooting distance designated by the user, convert the CG data into image data such as sRGB data, and display an image corresponding to the CG scene data on the monitor 211.

Spectral Radiance→sRGB

Figure 10:
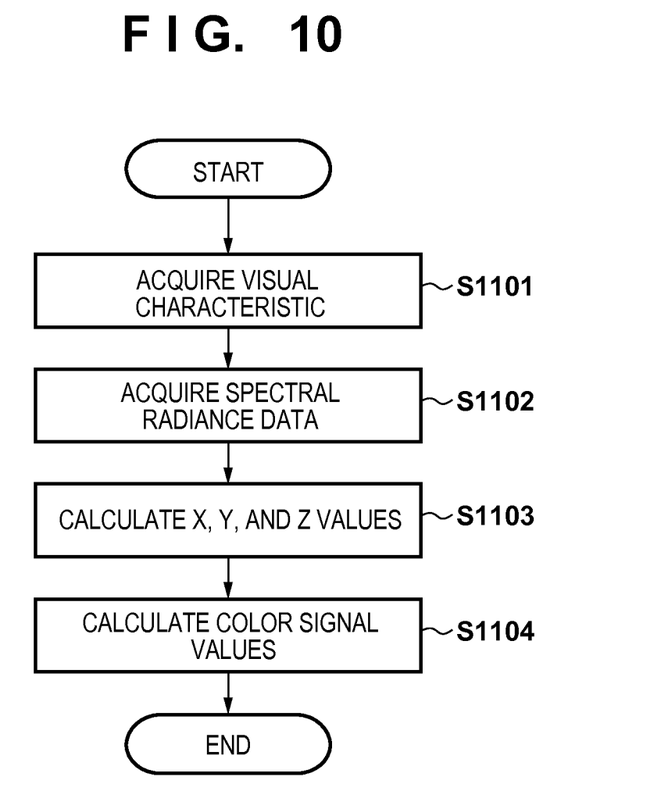
FIG. 10 is a flowchart illustrating processing of converting spectral radiance data into a color signal.

The processing of converting spectral radiance data into a color signal will be described below with reference to a flowchart shown in FIG. 10. Note that an sRGB signal is used as a color signal in the following description. Another color signal such as an AdobeRGB signal may be used.

The CPU 201 acquires the visual characteristic for converting the spectral radiance into a color signal (S1101). More specifically, the CPU 201 acquires conversion functions corresponding to the visual characteristic from, for example, the storage unit 203. The conversion functions are, for example, the color matching functions $x(\lambda)$, $y(\lambda)$, and $z(\lambda)$ of the CIEXYZ color coordinate system.

Next, the CPU 201 acquires spectral radiance data $Ex(\lambda)$ of each cell of the front clipping plane 102 in the raster order from the buffer (S1102). For the sake of simplicity, assume that the spectral radiance data $Ex(\lambda)$ of the central sub-cell of each cell is acquired. The acquired spectral radiance data $Ex(\lambda)$ is converted into CIEXYZ values using the color matching functions (S1103), as given by:

$$X = k\int Ex(\lambda)x(\lambda)d(\lambda);$$

$$Y = k\int Ex(\lambda)y(\lambda)d(\lambda);$$

$$Z = k\int Ex(\lambda)z(\lambda)d(\lambda); \quad (1)$$

where k represents a constant, and
the integration range is, for example, from 380 nm to 780 nm.

The CPU 201 converts the CIEXYZ values of the pixel of interest into RGB signal values, and then converts the RGB signal values into sRGB signal values (S1104), as given by:

$$\begin{bmatrix} R_{Linear} \\ G_{Linear} \\ B_{Linear} \end{bmatrix} = \begin{bmatrix} 3.2406 & -1.5372 & -0.4986 \\ -0.9689 & 1.8758 & 0.0415 \\ 0.0557 & -0.2040 & 1.05710 \end{bmatrix} \begin{bmatrix} X \\ Y \\ Z \end{bmatrix} \quad (2)$$

if ($R_{Linear} \leq 0.0031308$)

$R = 12.92 \cdot R_{Linear}$;

else $R = 1.055 \cdot R_{Linear}^{1.0/2.4} - 0.055$;

if ($G_{Linear} \leq 0.0031308$)

$G = 12.92 \cdot G_{Linear}$;

else $G = 1.055 \cdot G_{Linear}^{1.0/2.4} - 0.055$;

if ($B_{Linear} \leq 0.0031308$)

$B = 12.92 \cdot B_{Linear}$;

else $B = 1.055 \cdot B_{Linear}^{1.0/2.4} - 0.055$; \quad (3)

The CPU 201 performs the aforementioned processing for the spectral radiance data of each cell of the front clipping plane 102, thereby generating image data corresponding to the CG scene data.

Ray Tracing

The ray tracing processing (S505) will be described below with reference to a flowchart shown in FIG. 6.

Figure 6:
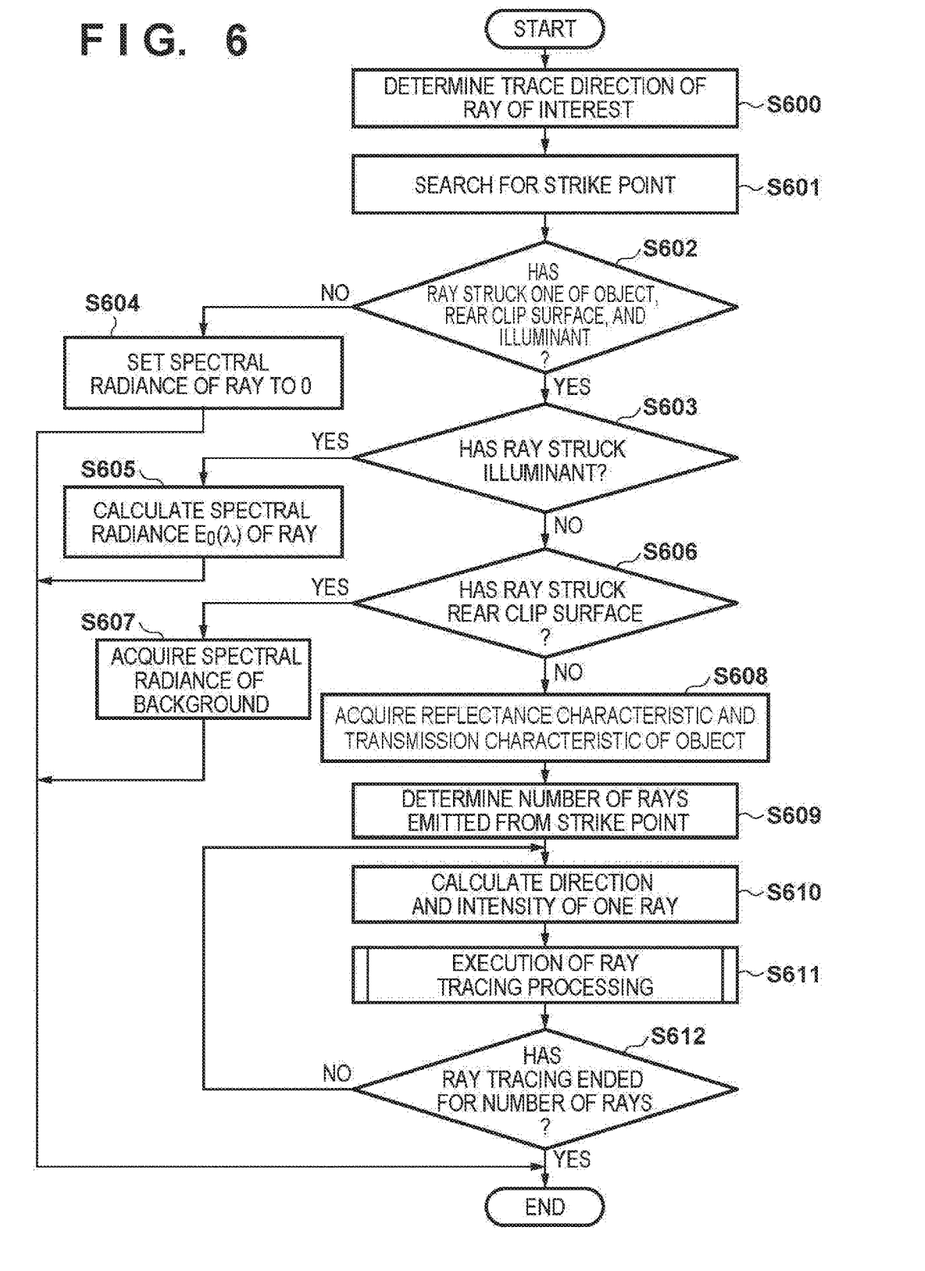
FIG. 6 is a flowchart illustrating ray tracing processing.

FIG. 6 shows ray tracing processing for one sub-cell. However, the processing of FIG. 6 is recursively called for each ray until it is detected in a scene that the ray does not strike the object or the ray strikes the illuminant. Although processing of monochromatic light of a wavelength λ will be explained here, it is possible to obtain the spectral radiance of each wavelength by performing the following processing for each wavelength set in step S502 or S508.

Based on the pixel position (sub-cell) set in step S504, the CPU 201 determines a lens through which the ray of interest passes, and determines the trace direction of the ray of interest (S600).

Next, the CPU 201 searches for a point (to be referred to a "strike point" hereinafter) at which the ray of interest reflected from a tracing start point strikes an object included in the scene (S601). The start point is the strike point or the lens corresponding to the pixel position. Note that the strike point may be searched for by any desirable method. For example, it is only necessary to sequentially determine, for all objects in the scene, a point at which the ray of interest strikes, and set a point closest to the start point as the strike point.

The CPU 201 determines whether the ray of interest has struck one of the object, illuminant, and back clipping plane 104 (S602), determines whether the ray of interest has struck the illuminant (S603), and determines whether the ray of interest has struck the back clipping plane 104 (S606). If the ray of interest has struck none of the object, illuminant, and back clipping plane 104, the spectral radiance of the ray of interest is set to 0 (S604), thereby terminating tracing of the ray of interest.

If the ray of interest has struck the illuminant, the CPU 201 calculates the spectral radiance E0(λ) of the ray of interest based on the intensity of the ray of interest and illuminant characteristic data (S605), thereby terminating tracing of the ray of interest. The spectral radiance E0(λ) of the ray of interest is saved in the buffer.

$$E0(\lambda) = P0(\lambda) Q(\theta) S(\lambda) \quad (4)$$

where P0(λ) represents the intensity of the ray of interest,

θ represents the incident angle of the ray of interest,

Q(θ) represents the light distribution characteristic of the illuminant in the θ direction, and S(λ) represents the spectral radiance of the illuminant.

The illuminant characteristic data Q(θ) and S(λ) represent the relationship between the exit direction of the ray and the intensity of the ray at the illuminant. Therefore, the intensity of the ray from the illuminant is calculated based on an angle (incident angle) formed by the normal to the illuminant and the ray of interest entering the illuminant at the strike point.

If the ray of interest has struck the back clipping plane 104, the CPU 201 acquires the spectral radiance Eb(λ) of the background (S607), thereby terminating tracing of the ray of interest. The spectral radiance Eb(λ) of the background is saved in the buffer.

If the ray of interest has struck the object, the CPU 201 acquires the reflection characteristic and transmission characteristic of the object (S608). The reflection characteristic includes an angle (incident angle) formed by the normal to the object and the ray of interest entering the object at the strike point, and the relationship between the ray intensity and an angle (exit angle) formed by the normal and the ray exiting from the object.

Next, the CPU 201 determines the number of rays reflected from the strike point (S609), and calculates the direction and intensity of one ray (S610). The number of rays is arbitrary. However, as the number is larger, less noisy image is finally obtained. In the case of diffuse reflection, the direction of the ray need only be uniformly distributed, and the intensity $P_r(\lambda_r)$ of reflected light and the intensity $P_t(\lambda_t)$ of transmitted light are calculated by:

$$P_r(\lambda_r) = P_0(\lambda_i) \times f_r(x, \omega_i, \lambda_r, \omega_r);$$

$$P_t(\lambda_t) = P_0(\lambda_i) \times f_t(x, \omega_i, \lambda_t, \omega_t); \quad (5)$$

where $P_0(\lambda_i)$ represents the intensity of a ray of a wavelength $\lambda_i$, which enters the object, $f_r$ represents the reflection characteristic of the object, and $f_t$ represents the transmission characteristic of the object.

In general, the intensity distribution of the reflected light depends on the surface shape of the object. As the surface of the object is smoother, the reflection intensity in the regular reflection direction, that is, a direction satisfying $\omega_i = \omega_r$, is higher, and the reflection intensities in other diffuse reflection directions are lower.

The reflection characteristic may be input from the storage unit 203 or the like, or a measurement result may be input from the measurement device 208. The data format of the reflection characteristic may be any desirable format as long as the reflectance of the object corresponding to the incident angle and exit angle of the light is obtained, and may be, for example, a unique function. Since diffuse reflection is isotropically distributed, the reflection characteristic of $\omega_i = 45°$ and $\omega_r = 0°$ may be applied to diffuse reflection, and an additionally prepared table may be applied to the reflection characteristic of regular reflection.

On the other hand, the reflection characteristic $f_r$ of the object is expressed by a bidirectional reflectance distribution function (BRDF) given by:

$$f_r(x, \omega_i, \lambda_r, \omega_r) = dL_r(x, \lambda_r, \omega_r) / L_i(x, \lambda_i, \omega_i)(\omega_r \cdot n) d\omega \quad (6)$$

where x represents a position on the object,
$\omega_i$ represents the incident angle,
$\lambda_i$ represents the wavelength of the incident ray,
$L_i$ represents the intensity of the incident ray,
$\omega_r$ represents the reflection angle,
$\lambda_r$ represents the wavelength of the exit ray,
$L_r$ represents the intensity of the exit ray, and
n represents the normal.

In general, since the intensity distribution of the transmitted light depends on a spectral refractive index, when the transmission angle $\omega_t$ satisfies equation (6) in place of the reflection angle $\omega_r$, the transmission intensity is highest. Note that the transmission characteristic need only be input from the storage unit 203 or the like. The data format of the transmission characteristic may be any desirable format as long as the transmittance of the object corresponding to the incident angle and refractive angle of the light is obtained, and may be, for example, a unique function. When $\omega_t$ is equal to the refractive angle, the transmission characteristic with $\omega_i = \omega_r = 0°$ may be applied. For other transmission characteristics, an additionally prepared table may be applied.

Next, the CPU 201 executes ray tracing processing (S611). That is, in step S611, the ray tracing processing shown in FIG. 6 is recursively called for each ray, and executed. The CPU 201 determines whether ray tracing has ended for the number of rays set in step S609 (S612). If ray tracing has not ended, the process returns to step S610 to repeat the ray tracing processing.

Determination of Trace Direction

The processing (S600) of determining the trace direction of the ray of interest will be described below.

Figure 8:
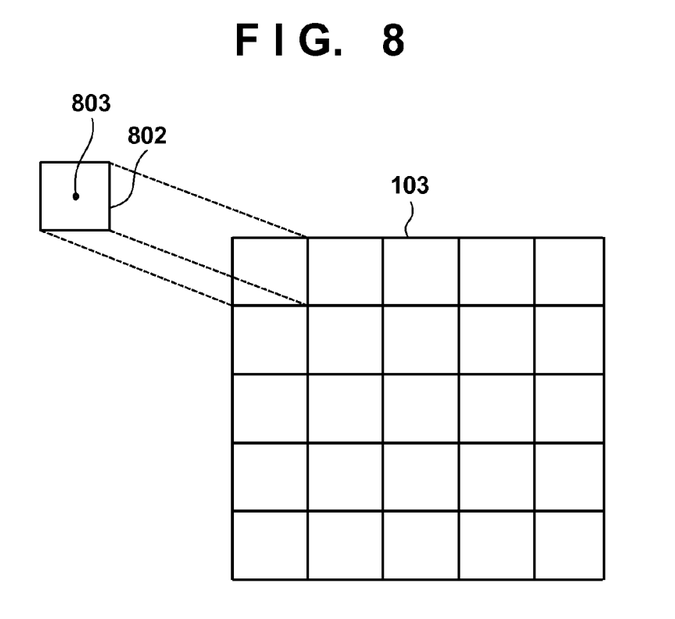
FIG. 8 is a view showing the arrangement of a lens array surface.

As shown in FIG. 8, the lens array surface 103 is formed by an array of a plurality of segments (lenses) 802, and an intersecting point 803 of a ray is defined for each lens 802. The lenses 802 and their intersecting points 803 are defined by lens surface data stored in, for example, the storage unit 203 or the recording medium 210. As described above, the lenses 802 correspond to lenses forming the lens array of the light field camera. Each lens 802 and its intersecting point 803 correspond to one cell of the front clipping plane 102. Note that FIG. 8 exemplifies the 5×5 lenses 802. However, there exist the lenses 802, the number of which corresponds to that of pixels of an image to be rendered, in other words, the number of which corresponds to that of cells of the front clipping plane 102.

The ray tracing method of this embodiment starts ray tracing along a line connecting the central position of the sub-cell set in step S504 and the intersecting point 803 of the lens 802 corresponding to the cell including the sub-cell. After that, ray tracing until the ray strikes the object or illuminant need only be executed, similarly to the general ray tracing method. This can reproduce the rays which pass through the lens array of the light field camera.

To perform ray tracing at higher accuracy, it is desirable to emit a ray a plurality of times for each sub-cell. In this case, the intersecting points of the rays within each sub-cell are randomly distributed. With this arrangement, even if the intersecting point of the ray with each lens 802 is limited to a particular point such as the central point of the lens 802, it is possible to distribute the ray having passed through the lens array surface 103 within a given range. If ray tracing is performed a plurality of times for each sub-cell, the average value of a plurality of spectral radiances obtained by performing ray tracing the plurality of times is recorded as a spectral radiance corresponding to the sub-cell.

Note that it is not necessary to set the intersecting points 803 with the respective lenses 802 at particular points such as the central points, and the intersecting points 803 with different relative positions may be defined for the respective lenses 802.

Figure 7:
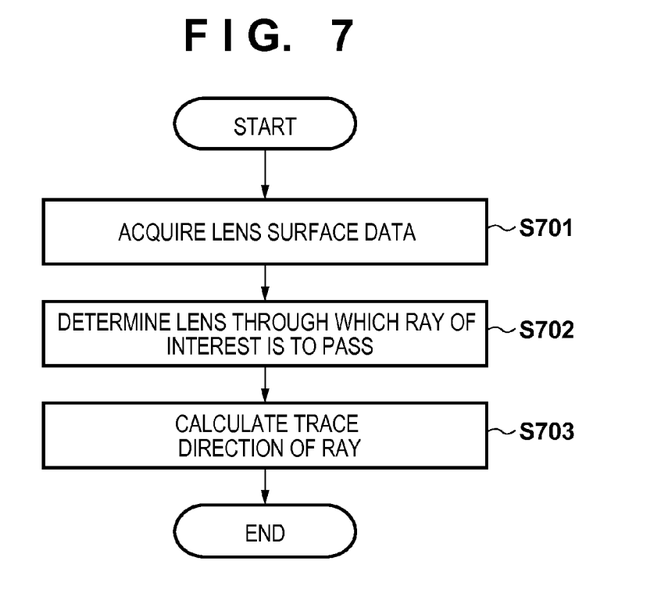
FIG. 7 is a flowchart illustrating processing of determining the trace direction of a ray.

FIG. 7 is a flowchart illustrating the processing (S600) of determining the trace direction of the ray of interest.

The CPU 201 reads out the lens surface data saved in the storage unit 203 or the recording medium 210 (S701). The lens surface data is data indicating the arrangement information of the lens array surface 103. The arrangement information includes, for each segment (lens) 802 forming the lens array surface 103, its position information, the intersecting point 803, the distance to the front clipping plane 102, and information about a corresponding cell of the front clipping plane 102.

Based on the lens surface data, the CPU 201 determines the lens 802 of the lens array surface 103, through which the ray passing through the pixel position (sub-cell) set in step S504 is to pass (S702). This determines the specific lens 802 through which the ray is to pass, that is, the intersecting point 803 of the specific lens 802 to be referred to.

If, for example, the upper left lens 802 of the lens array surface 103 is associated with the upper left cell of the front clipping plane 102, the ray passing through a sub-cell included in the cell is to pass through the lens 802. Therefore, the trace direction of the ray passing through the sub-cell of the cell is determined based on the intersecting point 803 of the upper left lens 802.

The CPU 201 calculates the trace direction of the ray (S703). That is, a vector connecting the central point of the sub-cell and the intersecting point 803 of the lens 802 determined in step S702 is calculated as the trace direction of the ray.

Consider a case in which a plurality of rays pass through different positions in a cell of the front clipping plane 102. In this case, a range within which each ray can pass through in the cell of the front clipping plane 102 has the same shape (for example, a square) as that of the cell. The ray passes through, for example, the central point of the lens 802 of the lens array surface 103. The passage range of the ray thereafter has a shape (for example, a square), as indicated by the region 401 or 402 on the back clipping plane 104 in FIG. 2. That is, with the ray tracing method of this embodiment, it is possible to acquire information more than that obtained by the light field camera in which the passage range of a ray has a circular shape depending on a lens shape.

Note that if it is desirable to make light-field data to be generated closer to light-field data acquired by the light field camera, it is only necessary to limit the passage range of a ray of the front clipping plane 102 to sub-cells included in a circular or oval region inscribed in the cell. The shape of the cell is not limited to a square, and may be a polygon such as a triangle or equilateral hexagon.

[Arrangement of Image Processing Apparatus]

Figure 11:
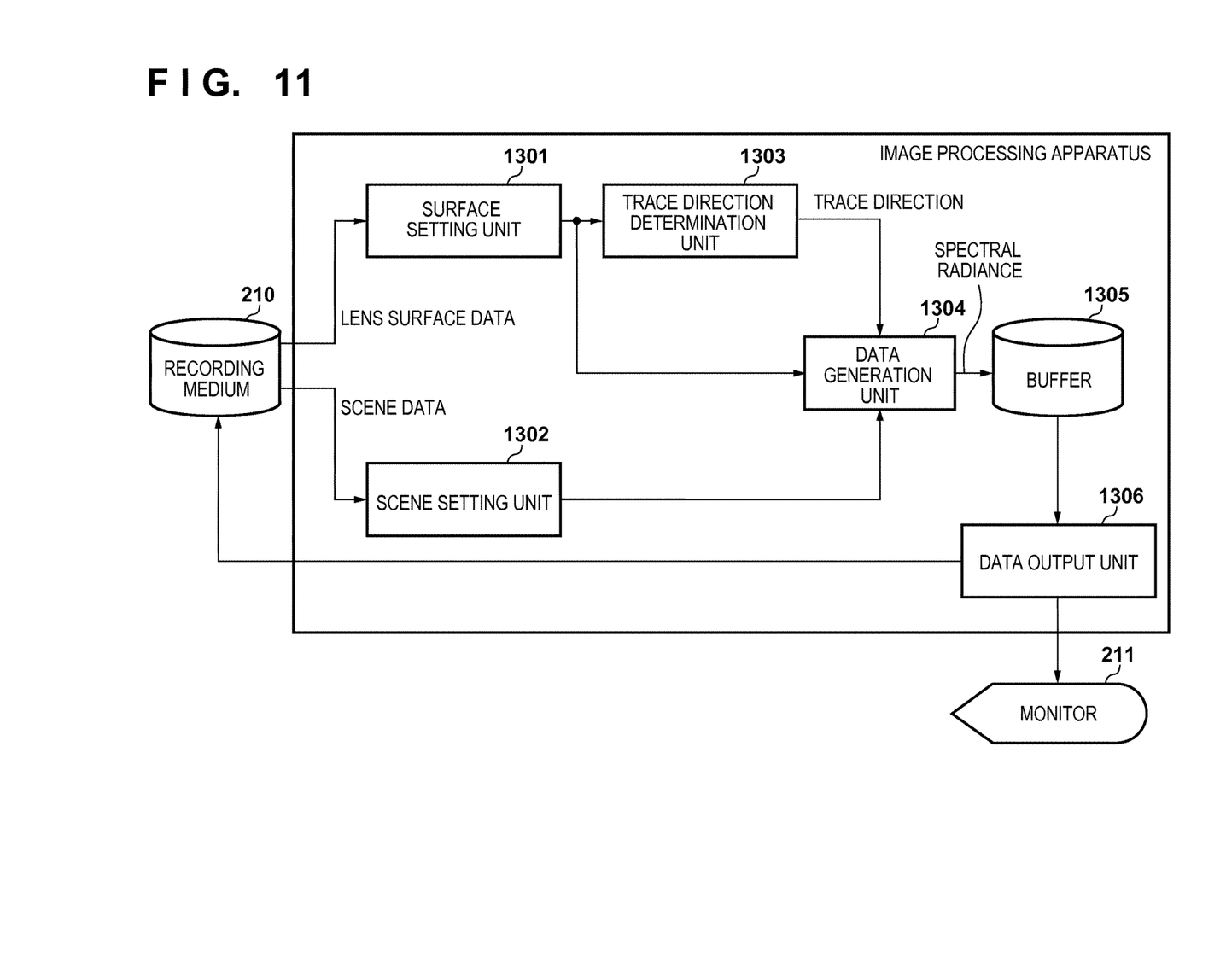
FIG. 11 is a block diagram showing the arrangement of an image processing apparatus according to the embodiment.

FIG. 11 is a block diagram showing the arrangement of an image processing apparatus according to the embodiment. The arrangement is implemented when the CPU 201 executes the aforementioned image processing.

A surface setting unit 1301 acquires lens surface data from the recording medium 210 or the like, and sets the front clipping plane 102, the lens array surface 103, and the back clipping plane 104. As described above, the front clipping plane 102 as the first surface includes the plurality of cells and the plurality of sub-cells obtained by dividing each of the plurality of cells. The lens array surface as the second surface includes the plurality of segments (lenses) 802. Each of the plurality of cells of the front clipping plane 102 is associated with each of the plurality of segments 802 of the lens array surface 103.

A scene setting unit 1302 acquires scene data from the recording medium 210, and arranges an object and an illuminant included in the scene data between the lens array surface 103 and the back clipping plane 104.

A trace direction determination unit 1303 determines the trace direction of a ray passing through each sub-cell based on the information of the segment 802 associated with the cell including the sub-cell with reference to the lens surface data.

A data generation unit 1304 performs, for each sub-cell, spectral ray tracing in the determined trace direction between the lens array surface 103 and the back clipping plane 104, and records a spectral radiance based on the result of spectral ray tracing in a buffer 1305 allocated in the main memory 202. The obtained spectral radiance data recorded for the respective sub-cells correspond to the light-field data of the scene between the lens array surface 103 and the back clipping plane 104.

By using the light-field data stored in the buffer 1305, a data output unit 1306 generates CG data which is focused as designated by the user, and displays an image expressed by the CG data on the monitor 211. The light-field data stored in the buffer 1305 are stored in the recording medium 210 as the light-field data of the CG image.

As described above, it is possible to generate the light-field data of the CG scene using the ray tracing method.

Modification of Embodiment

Figure 9:
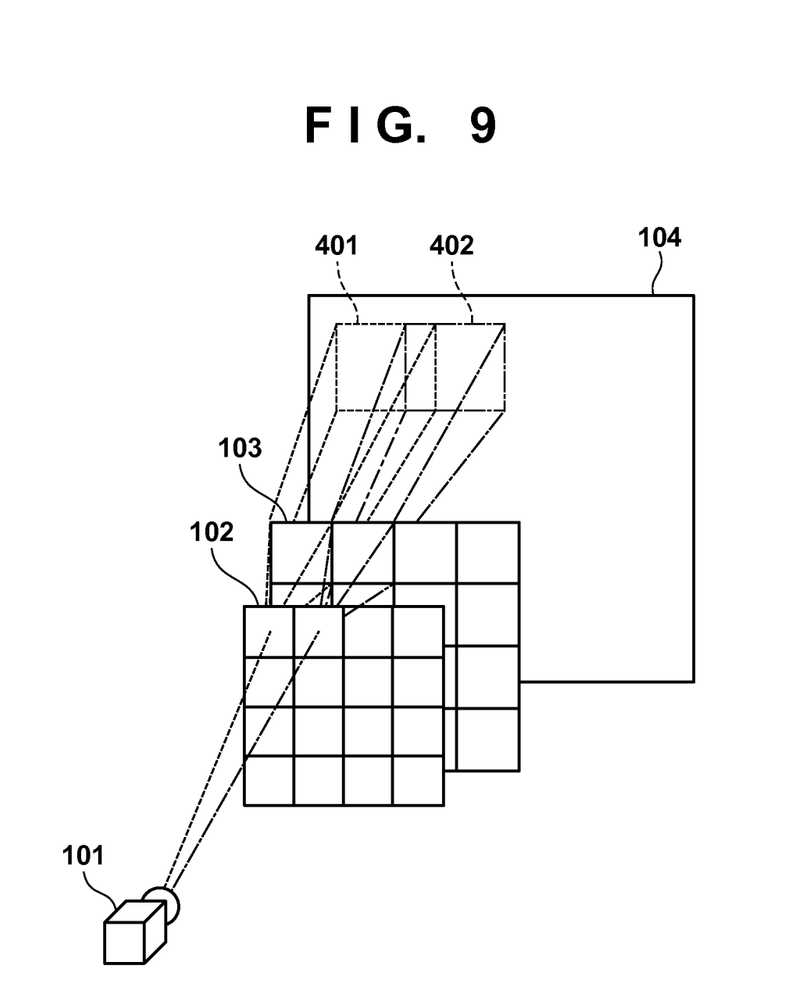
FIG. 9 is a view showing a modification of the processing of determining the trace direction of the ray.

A method of determining the trace direction of a ray based on the relationship between the sub-cell of the front clipping plane 102 and the intersecting point 803 of the segment (lens) 802 of the lens array surface 103 has been explained above. The trace direction of the ray can be determined according to the area of the segment 802 forming the lens array surface 103.

As shown in FIG. 9, the camera 101 emits rays toward the central points of the sub-cells of the front clipping plane 102. The trace direction of each ray which passes through the central point and travels toward the segment 802 corresponding to the cell including the sub-cell is randomly changed within the range of the segment 802.

When determining the trace direction in this way, the processing (S600) of determining the trace direction of the ray of interest, which is shown in the flowchart of FIG. 6, is different. That is, in step S600, the trace direction of the ray is randomly determined according to the central point of the sub-cell and the range of the corresponding segment 802.

The processing shown in the flowchart of FIG. 7 is also different. In the above processing, in step S703, a vector connecting the central point of the sub-cell and the intersecting point 803 of the segment 802 determined in step S702 is calculated as the trace direction of the ray. Instead, in step S703, a position at which the ray intersects the segment 802 is randomly determined, and a vector connecting the central point of the sub-cell and the determined intersecting point is calculated as the trace direction of the ray.

Therefore, as the area of the segment 802 is larger, the intersecting point settable range is enlarged, thereby making it possible to enlarge the ray traveling ranges 401 and 402.

As described above, by changing the trace direction of the ray in accordance with the area of the segment 802 of the lens array surface 103, it becomes possible to acquire high-accuracy light-field data using the spectral ray tracing method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-003697 filed Jan. 10, 2014 which is hereby incorporated by reference herein in its entirety.

What is claimed is:

1. An image processing apparatus for generating light-field data of a scene using a ray tracing method, comprising:
   one or more hardware processors; and
   a memory coupled to the one or more hardware processors and storing instructions that, when executed by the one or more hardware processors, cause the image processing apparatus to:
      set a first surface, a second surface, and a third surface in order in a direction of a scene, wherein the first surface has a plurality of cells and a plurality of sub-cells divided from each of the plurality of cells, the second surface has a plurality of segments, and the plurality of cells and the plurality of segments are associated respectively;
      determine a trace direction of a ray passing through each sub-cell based on a segment associated with a cell including the sub-cell; and
      perform ray tracing on the determined trace direction for each sub-cell so as to generate light-field data of the scene between the second and third surfaces.

2. The apparatus according to claim 1, wherein a direction which connects a position where the ray intersects with the sub-cell and a particular point in the segment is determined as the trace direction.

3. The apparatus according to claim 2, wherein the particular point is a central point of the segment.

4. The apparatus according to claim 2, wherein the particular point is different for each segment.

5. The apparatus according to claim 1, wherein a direction which connects a position where the ray intersects with the sub-cell and an arbitrary point in the segment is determined as the trace direction.

6. The apparatus according to claim 1, wherein a direction which connects a position where the ray intersects with the sub-cell and an arbitrary point in a circular or oval region inscribed in the segment is determined as the trace direction.

7. The apparatus according to claim 2, wherein configuration information for the second surface is obtained, and the determination is performed based on information with respect to the plurality of segments included in the configuration information.

8. The apparatus according to claim 7, wherein the configuration information contains information which prescribes the particular point for each of the plurality of segments.

9. The apparatus according to claim 1, wherein the ray passes through a center of the sub-cell.

10. The apparatus according to claim 1, wherein the ray passes through an arbitrary point in the sub-cell.

11. The apparatus according to claim 1, wherein spectral radiance for each of the plurality of sub-cells based on a result of the ray tracing is recorded as the light-field data.

12. The apparatus according to claim 1, wherein the cell corresponds to a pixel of a light field camera, and the segment corresponds to a lens of a microlens array of the light field camera.

13. An image processing method of generating light-field data of a scene using a ray tracing method, the image processing method comprising:
using a processor to perform steps of:
setting a first surface, a second surface, and a third surface in order in a direction of a scene, wherein the first surface has a plurality of cells and a plurality of sub-cells divided from each of the plurality of cells, the second surface has a plurality of segments, and the plurality of cells and the plurality of segments are associated respectively;
determining a trace direction of a ray passing through each sub-cell based on a segment associated with a cell including the sub-cell; and
performing ray tracing on the determined trace direction for each sub-cell so as to generate light-field data of the scene between the second and third surfaces.

14. A non-transitory computer readable medium storing a computer-executable program for causing a computer to perform a method of generating light-field data of a scene using a ray tracing method, the method comprising steps of:
setting a first surface, a second surface, and a third surface in order in a direction of a scene, wherein the first surface has a plurality of cells and a plurality of sub-cells divided from each of the plurality of cells, the second surface has a plurality of segments, and the plurality of cells and the plurality of segments are associated respectively;
determining a trace direction of a ray passing through each sub-cell based on a segment associated with a cell including the sub-cell; and
performing ray tracing on the determined trace direction for each sub-cell so as to generate light-field data of the scene between the second and third surfaces.

* * * * *